(12) United States Patent
Liu

(10) Patent No.: US 10,380,764 B2
(45) Date of Patent: Aug. 13, 2019

(54) SYSTEM AND METHOD FOR PERFORMING VISION SYSTEM PLANAR HAND-EYE CALIBRATION FROM STRAIGHT LINE FEATURES

(71) Applicant: Cognex Corporation, Natick, MA (US)

(72) Inventor: Gang Liu, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/132,031

(22) Filed: Dec. 18, 2013

(65) Prior Publication Data
US 2015/0170365 A1 Jun. 18, 2015

(51) Int. Cl.
*G06T 7/80* (2017.01)

(52) U.S. Cl.
CPC ...... *G06T 7/80* (2017.01); *G06T 2207/10016* (2013.01); *G06T 2207/30108* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 5,960,125 A * | 9/1999 | Michael | G06T 7/0018 382/151 |
| 6,101,455 A | 8/2000 | Davis | |
| 7,046,840 B2 | 5/2006 | Chang et al. | |
| 7,453,456 B2 | 11/2008 | Petrov et al. | |
| 7,486,805 B2 | 2/2009 | Krattiger | |
| 7,671,891 B2 | 3/2010 | Fitzgibbon et al. | |
| 7,715,644 B2 | 5/2010 | Kochi et al. | |
| 8,369,610 B1 | 2/2013 | Korobkin | |
| 2006/0087633 A1* | 4/2006 | Omura | G03F 7/70241 355/53 |

(Continued)

FOREIGN PATENT DOCUMENTS

CN 101957176 B 5/2012

OTHER PUBLICATIONS

Ammi, Mehdi, Vincent Frémont, and Antoine Ferreira. "Automatic camera-based microscope calibration for a telemicromanipulation system using a virtual pattern." IEEE Transactions on Robotics 25.1 (2009): 184-191.*

*Primary Examiner* — Vu Le
*Assistant Examiner* — Tracy Mangialaschi
(74) *Attorney, Agent, or Firm* — Loginov & Associates, PLLC; William A. Loginov

(57) ABSTRACT

This invention provides a system and method for hand-eye calibration of a vision system using an object under manufacture having at least one feature. The feature can be a linear feature and the object moves in at least one degree of freedom in translation or rotation on a motion stage. The system further comprises at least a first vision system camera and vision processor. The first vision system camera is arranged to acquire an image of the first linear feature on the object under manufacture and to track motion of the first linear feature in response to moving of the motion stage in at least one degree of translation. The first linear feature is identified in at least two different positions along a plane. The system computes a mapping between pixel positions in a pixel coordinate system of the first camera and physical positions in a motion coordinate system based upon locations of the at least two positions.

20 Claims, 6 Drawing Sheets

(56) References Cited

U.S. PATENT DOCUMENTS

2010/0066838 A1* 3/2010 Steckhan ............... G06T 7/0018
348/187
2011/0280472 A1* 11/2011 Wallack ................. B25J 9/1692
382/153

* cited by examiner

SYSTEM AND METHOD FOR PERFORMING VISION SYSTEM PLANAR HAND-EYE CALIBRATION FROM STRAIGHT LINE FEATURES

FIELD OF THE INVENTION

The present invention relates to calibration systems and methods, and calibration objects used in machine vision system applications.

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks. More particularly, a vision system can be used to inspect a flat work piece passing through an imaged scene. The scene is typically imaged by one or more vision system cameras that can include internal or external vision system processors that operate associated vision system processes to generate results. It is generally desirable to calibrate one or more cameras to enable it/them to perform the vision task(s) with sufficient accuracy and reliability. A calibration plate can be employed to calibrate the cameras.

A calibration object (often in the form of a "plate") is often provided as a flat object with distinctive patterns made visible on its surface. The distinctive pattern is generally designed with care and precision, so that the user can easily identify each visible feature in an image of the plate acquired by a camera. Some exemplary patterns include, but are not limited to, dot grids, line grids, or conceivably a honeycomb pattern, a checkerboard of triangles, etc. Characteristics of each visible feature are known from the plate's design, such as the position and/or orientation relative to a reference position and/or coordinate system implicitly defined within the design.

The design of a checkerboard pattern, consisting of a tessellated array of crossing lines, provides certain advantages in terms of accuracy and robustness in performing calibration, even in presence of perspective and lens distortions, partial damage to the pattern, and uneven lighting, among other non-ideal conditions. More particularly, in the two-dimensional (2D) calibration of a stationary object, determining the relative position of individual checkerboard tile corners by edges of the calibration checkerboards is typically sufficient to determine accuracy of the vision system, and as appropriate, provide appropriate correction factors to the camera's processor so that runtime objects are measured in view of such correction factors.

By way of further background on a general understanding of certain calibration principles, for a rigid body, such as a calibration plate, a motion can be characterized by a pair of poses: a starting pose immediately preceding a motion, and an ending pose immediately following the motion—a "pose" herein being defined as a set of numerical values to describe the state of a body, at any one particular instant in time, in some underlying coordinate system—a virtual characterization of the body. For example, in two dimensions, a rigid body can be characterized by three numbers: a translation in X, a translation in Y, and a rotation R. A pose in the context of a calibration plate describes how the calibration plate is presented to the camera(s), when there is relative motion between the camera(s) and the calibration plate. Typically, in a standard so-called "hand-eye calibration", a calibration plate is presented at a number of different poses to the camera(s), and each camera acquires an image of the calibration plate at each such pose. For machine vision hand-eye calibration, the calibration plate is typically moved to a plurality of predetermined poses at which cameras acquire respective images of the plate. The goal of such hand-eye calibration is to determine the rigid body poses of the camera(s) and calibration plate in the "motion coordinate system". The motion coordinate system can be defined in a variety of ways. The numbers in the poses (that specify where the calibration plate and/or cameras reside in the space) must be interpreted in an appropriate coordinate system. Once a single unified coordinate system is selected, the poses and motion are described/interpreted in that global coordinate system. This selected coordinate system is often termed the "motion coordinate system." Typically "motion" is provided by a physical device that can render physical motion, such as a robot arm, or a motion stage, such as a gantry. Note that either the plate can move relative to one or more stationary camera(s) or the camera(s) can move relative to a stationary plate. The controller of such a motion-rendering device employs numerical values (i.e. poses) to command the devices to render any desired motion, and those values are interpreted in a native coordinate system for that device. Note, although any motion coordinate system can be selected to provide a common, global coordinate system relative to the motion-rendering device and camera(s), it is often desirable to select the motion-rendering device's native coordinate system as the overall motion coordinate system.

Hand-eye calibration, thus, calibrates the system to a single motion coordinate system by rendering of motions (either moving the calibration plate or moving the cameras), and acquiring images before and after that motion to determine the effects of such motion on a moving object. By way of further background, this differs from typical intrinsic and extrinsic camera calibration that does not involve (is "free of") determining the camera's extrinsic pose in a motion coordinate system. In such instances, the camera(s) are typically all calibrated relative to the coordinate system of the calibration plate itself, using one acquired image of the plate, which is in a particular position within the field of view of all cameras. The machine vision calibration software deduces the relative position of each camera from the image of the plate acquired by each camera. This calibration is said to "calibrate cameras to the plate", whereas a hand-eye calibration is said to "calibrate cameras to the motion coordinate system."

When the machine vision system employs hand-eye calibration, its software solves poses by correlating the observed motion effect in the images with the commanded motion (for which the commanded motion data is known). Another result of the calibration is a mapping between each pixel position in a camera's image and a physical position in the motion coordinate system, so that after finding a position in the image space, the position in the motion coordinate system can be translated and the motion-rendering device can be commanded to act upon it.

In various manufacturing processes, it is desired to align a flat work piece or more generally a work piece where the features of interest reside in discrete planes that are often parallel. More particularly, in assembly applications, one work piece is aligned to another work piece. One exemplary process entails inserting the cover glass of a cellular telephone or a tablet computer into its housing. Another exemplary process involves print applications in which the work piece is aligned to the process equipment, such as when screen printing of the cover glass of cellular telephones, tablet computers, or flat panel displays.

The standard technique for machine vision hand-eye calibration, for example in the above-described cover-glass mounting arrangement, which requires the movement of a special calibration target (e.g., a checkerboard calibration plate), can be cumbersome for operational reasons (e.g., spatial constraints in the work volume, special mounting fixture and/or gripper for holding the target). This can entail the use of custom designed calibration plates and/or fixtures that increase cost and setup time.

SUMMARY OF THE INVENTION

This invention overcomes disadvantages of the prior art by providing a system and method for performing planar (i.e. 2D) hand-eye calibration by moving a typical (runtime) work piece, which the underlying part/object handling device (e.g. a robot manipulator and/or motion stage) is designed to handle during its intended, runtime manufacturing process. The system and method reduces a vision system's reliance on a special calibration target during hand-eye calibration. Specifically, the illustrative embodiments enable the performance of hand-eye calibration by viewing only one or more straight line features on an object/work piece during stage motion. This system and method can desirably achieve a sufficient level of calibration accuracy for a wide range of vision system applications. The system and method illustratively performs hand-eye calibration by viewing only one or more straight line features on the work piece during stage motion, and using these features to establish a coordinate system for use as a reference by the vision system. This system and method can be applied to single-camera arrangements or a multiple camera arrangement using a single, global (and/or motion) coordinate system In an illustrative embodiment, a system and method for planar (2D) hand-eye calibration of a vision system using an object under manufacture having at least one feature is provided. The feature can be a linear feature and the object moves in at least one degree of freedom in translation or rotation on a motion stage. The system further comprises at least a first vision system camera and vision processor. The first vision system camera can be calibrated in view of a variety of parameters that can (or may not) include camera intrinsics, and arranged to acquire an image of the first linear feature on the object under manufacture and to track motion of the first linear feature in response to moving of the motion stage in at least one degree of translation. A process/processor identifies the first linear feature in at least two different positions along a two-dimensional (2D) plane and computes a mapping between pixel positions in a pixel coordinate system of the first camera and physical positions in a motion coordinate system based upon locations of the at least two positions. The linear feature can be at least one of an edge, a shelf and a region with contrast difference. Optionally, a second vision system camera can be provided, which can also be calibrated. Additional, optional vision system cameras (e.g. a third, forth, etc.) can also be provided to the arrangement in further embodiments. The second vision system camera can be arranged to identify and discretely track at least a second linear feature on the object under manufacture, respectively. Alternatively each of two or more cameras (first camera, second camera, etc.) can track the same first (etc.) feature (for example from different points of view). The motion stage comprises at least a first slide that translates the object under manufacture along an x axis and a second slide that translates the object under manufacture along a y axis, usually nominally orthogonal to the x axis, on the 2D plane. The motion stage can include a lift arranged to translate the object under manufacture orthogonally to the 2D plane along a z axis. The system can further include a rotary stage that rotates the object under manufacture about at least one of the x axis, the y axis and the z axis. At least one of the first slide, the second slide and the lift can be powered by an actuator comprising a rotating lead screw and controlled motor. The rotary stage illustratively rotates the object under manufacture. The motion stage can comprise a lead-screw driven slide and controlled motor operatively connected to the lead screw. The motor can comprise at least one of a servo motor and a stepper motor. The motion stage can alternately comprise a slide and a controlled linear motor operatively connected thereto.

BRIEF DESCRIPTION OF THE DRAWINGS

The invention description below refers to the accompanying drawings, of which.

DETAILED DESCRIPTION

I. Hand-Eye Calibration, Further Considerations

Figure 1:
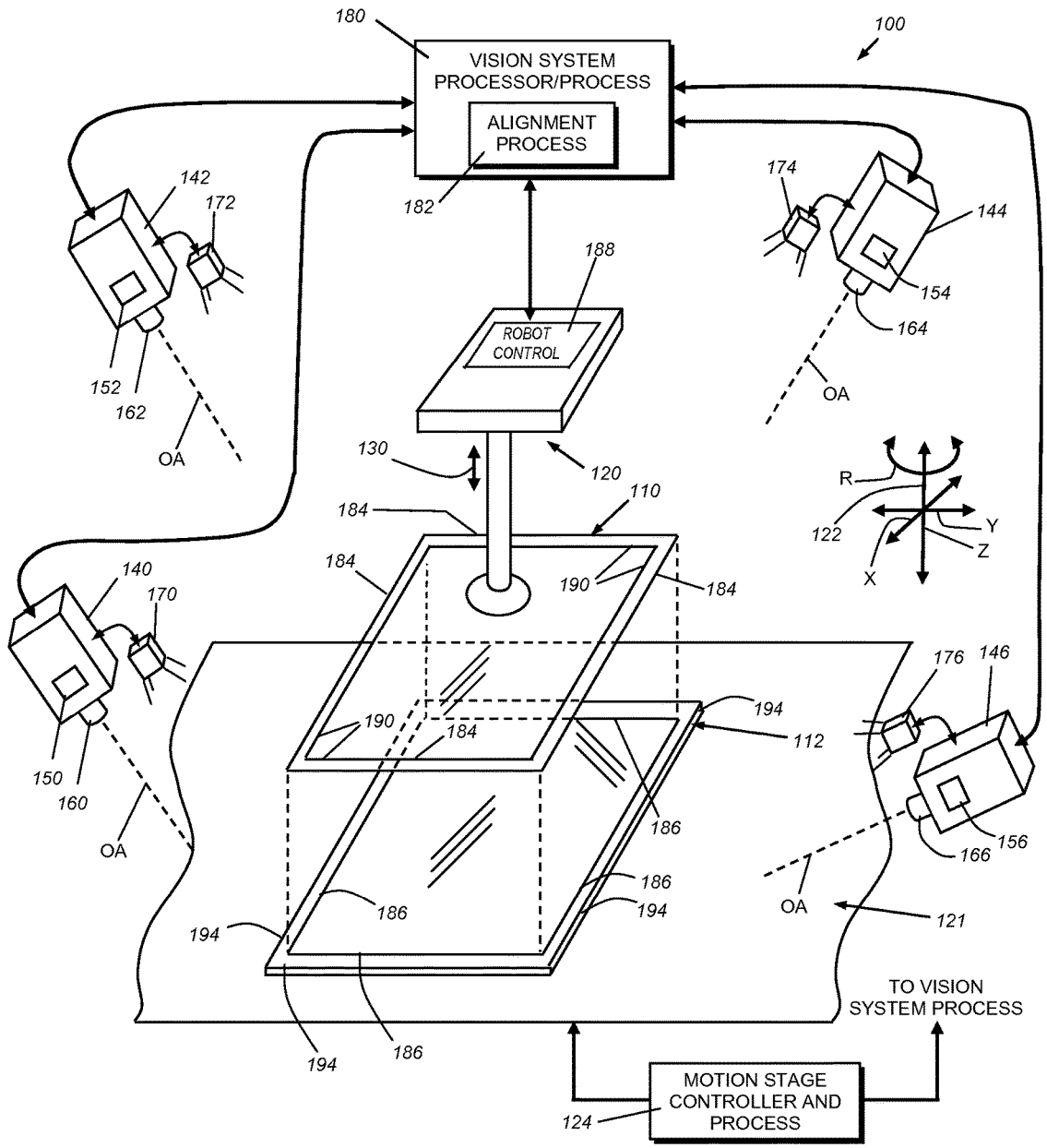
FIG. 1 is a diagram of an exemplary manufacturing arrangement employing one or more machine vision system cameras and associated processing components for use in relation to the system and method for calibration in accordance with illustrative embodiments herein.

Traditional hand-eye calibration, whether performed manually, or within a vision system, entails establishing correspondence between observed image feature positions and their expected physical positions, and minimizing the discrepancy between the observed positions and the expected positions. In the illustrative embodiment, the use of linear features, and the like, employs various aspects of traditional hand-eye calibration, but additional considerations are addressed. These considerations arise because of the differences between the calibration features available in traditional hand-eye calibration as performed in the prior art and the novel approach to calibration using runtime objects of manufacture and selected linear features thereon. These differences relate primarily to the type of correspondence, which in turn, results in different ways to compute and minimize the discrepancy between the observed data in the acquired image and the expected data.

The prior art approach employs "point data", which fully specifies a feature's 2D position along x and y axes. Note that in 3D hand-eye calibration, the point data completely specifies a feature's 3D position. However, the illustrative embodiment describes 2D hand-eye calibration within a plane, and thus the considerations applicable mainly in a 2D environment are further described below. For example, if the feature is a circular disk, the "point data" contains the x and y coordinates of its center. It is contemplated that a third dimension can be entered using appropriate techniques. A solution with associated equations in relation with a point-to-point distance metric is taught and described in commonly assigned U.S. patent application Ser. No. 13/835,759, entitled MACHINE VISION SYSTEM CALIBRATION USING INACCURATE CALIBRATION TARGETS, by Gang Liu, et al., and referenced U.S. Pat. No. 5,960,125, entitled NONFEEDBACK-BASED MACHINE VISION METHOD FOR DETERMINING A CALIBRATION RELATIONSHIP BETWEEN A CAMERA AND A MOVEABLE OBJECT, by David J. Michael, et al., the teachings of each of which are expressly incorporated by reference as useful background information.

The illustrative embodiment employs "linear data", which only partially specifies a feature's 2D position in the x-y plane. That is, in the case of a straight line (linear feature) extending through the entire field of view (FOV) of a camera, that camera does not image the end points of the exemplary straight line. More particularly, the camera lacks any source of information regarding the end points of that straight line. Thus, from the image data, the camera and associated vision system can determine the line's position only along the normal direction (perpendicular to the extension of the straight line/linear feature in the image), but lacks data to determine which segment of the straight line is actually being imaged. In fact, if the camera is translated exactly along the direction of the straight line, the acquired image would remain exactly the same. Therefore, the camera and vision system contain data to determine the line's position only along one dimension (perpendicular to the line's extension). As such, when trying to correspond an observed linear feature with an expected linear feature, there is no useful information as to the relative translation of the two features (observed and expected) along the extension of the linear feature. This is a key difference in attempting to calibrate from a line, where positional data is only available along a normal to the line, as opposed to more-traditional calibration using point data, where positional data is available in both of two perpendicular dimensions (i.e. along both x and y axes). By way of non-limiting example, an equation for computing a point-to-line distance can be defined as:

$$d = u*y - v*x - r$$

Where (x, y) specifies the position of the given point. (r, u, v) parameterizes a given line for which (u, v) is its unit-length direction vector, and for which r is the signed perpendicular distance from the origin (0, 0). d is the signed perpendicular distance from the point to the line. Note that the point falls exactly onto the line if and only if d=0. Note also, it is contemplated that the above equation represents one of a wide variety of techniques for specifying a point-to-line correspondence. Other techniques that should be clear to those of skill, based upon the teachings herein, are expressly contemplated.

By way of example and comparison, in traditional hand-eye calibration vision system calibration process operates in a relatively straightforward manner to compute the distance between two points, one derived from the observed image position, and the other derived from an expected position. This computation generates the required calibration parameters for the camera to use in runtime operation. However, the computation of calibration parameters based upon linear data exclusively differs in that that calibration process/algorithm employs a so-called point-to-line metric, which is the perpendicular distance from a given point to a given line. Any point on the observed line segment extracted from the image can serve as the point, wherein that point serves the role as the observed data in the correspondence. An expected line is a hypothesized model for the object (part) edge being observed, and is affected by the particular motion stage pose at which the image was acquired. The distance from the point to the line is the discrepancy that the hand-eye calibration theory attempts to minimize. This generalized process is described further below.

According to the illustrative embodiment for calibration using linear features, a goal is to allow the calibration to occur using runtime objects under manufacture—i.e. one or more objects that are imaged and manipulated during an actual manufacturing/handling process rather than using a purpose-built calibration object. Such calibration assumes that the part includes certain edges, shelves, etc. that can qualify as linear features. The use of a runtime object under manufacture enhances convenience of operation and avoids the downtime and concomitant cost of deploying a calibration object to the scene and associated motion stage. In general, the geometry of the object can be loosely toleranced, and precise measurement of its geometry before using it for calibration is often undesirable.

Both a special calibration object and an object under manufacture (used in calibration) can contain one or more image features suitable for vision system processes/algorithms to extract. A key difference between use of a dedicated calibration object and a runtime object is the typical lack of availability of precise measurements for the relative spatial relationship among the (typically multiple) features or the different parts of the features in a runtime object, while measurements are highly accurate and readily available within the pattern of a calibration object. If such measurements are available in a runtime object, they are typically available at only very low precision and accuracy such that, if used as regular calibration objects, would cause large errors in calibration results. Thus, hand-eye calibration (and the associated calibration process/processor) in accordance with the illustrative embodiments can be generally free of prior knowledge of the geometry of the runtime object. The process/processor deduces the appropriate equations for the observed straight lines (linear features) in the imaged object as part of the hand-eye calibration procedure, in a manner free of any requirement for input of precisely measured geometry, such as part width or height. In this manner, the calibration process/processor according to the illustrative embodiments herein derives the appropriate calibration parameters for the camera and associated visions system using a minimum of prior information and using an object that would normally pass through the scene on the motion stage, using motion along (for example) an x-y plane in one or more directions that is also used during runtime operation of the stage. This minimizes or eliminates the need for specially built calibration objects, fixtures or the like and instead relies on the available motion and feedback capabilities of the stage.

It is noted more generally that the illustrative embodiments herein specify "planar" or 2D hand-eye calibration—that is, that the calibration procedure using linear features operates for objects experiencing motion along a plane (e.g.

x, y). One or more height (e.g. z-axis) values can be specified where appropriate, but are generally not varied for a given set of calibration measurements along a plane.

II. Illustrative Vision System Arrangement

By way of non-limiting example, FIG. 1 shows a generalized manufacturing arrangement 100 in which a first object or work piece 110 is suspended above a second object or work piece 112 by a moving robot manipulator and/or motion stage assembly 120. The first work piece 110 can be a transparent window or other planar structure in various embodiments and the second work piece 112 can be a frame or housing that is constructed and arranged to permanently receive the first work piece 110 in an assembly step. The first work piece can be transparent (as shown), semi-transparent or opaque over all or a portion of its surface. The unassembled and assembled configurations for the work pieces 110, 112 are described further below. The second work piece 112 is located on a motion stage (that can include a part conveyor) 121 that moves in each of a plurality of directions (arrows 122) under the control of a motion stage controller and associated control process 124 in accordance with skill in the art. The directions 122 can be characterized as x-axis and y-axis translation (or motion) within an x-y plane, and (optionally) z-axis translation (motion) perpendicular to the x-y plane. Likewise, a rotational motion R can occur about at least the z axis. In an illustrative arrangement, the manipulator assembly 120 can be constructed and arranged to move (arrow 130) along at least one axis (z) and optionally along the x and/or y axis. Alternatively all z-axis motion used during assembly of the objects 110 and 112 can be performed by the motion stage itself. The direction of motion stage translation, and the directions of movement of the motion stage 121 can be considered the axes in a "motion coordinate system" of the vision system cameras to which they are all calibrated during an offline (non-runtime) calibration process using appropriate techniques to be described further below. An alternate arrangement 100 can include the provision of rotation (i.e. "tilt") about the x and/or y axes.

The arrangement 100 includes at least one, and illustratively four, vision system cameras 140, 142, 144 and 146, each with a respective image sensor (or simply "sensor") 150, 152, 154 and 156. Each sensor 150, 152, 154 and 156 receives light from an imaged scene within its field of view through a respective lens assembly 160, 162, 164 and 166. The scene is illuminated by one or more illumination assemblies 170, 172, 174 and 176 that can be strobed by the processors of respective cameras 140, 142, 144 and 146. One or more of the illumination assemblies can be "internal", such as a ring illuminator surrounding the camera lens on the camera housing, or one or more of the illumination assemblies can be external, positioned to provide an acceptable illumination effect at the scene so as to minimize occlusion and other undesirable effects, such as reflections due to specularity of surfaces. A greater or fewer number of illuminators can be provided than those depicted in the arrangement 100 of FIG. 1. Additionally, while the cameras 140, 142, 144 and 146 are depicted with optical axes OA tilted toward the scene (at an acute angle with respect to the z axis), in alternate embodiments, the cameras optical axes OA of each of the cameras can be approximately aligned (i.e. on-axis) with the z axis. In general, the cameras are arranged to provide as complete, and unobstructed a view of the edges of two work pieces 110 and 112 as practically feasible.

A vision system processor for each (one or more) camera can be located, in whole or in part, within the respective camera housing. The vision system processor and processing functionality associated with each camera is represented by block 180. Where an individual vision system processor 180 is provided to each camera, that camera can individually process image information, and share vision system results with a further remote processor, such as a PC. Alternatively, one or more camera processor(s) can act as a "master" vision system processor, and the other cameras act as a "slave", delivering unprocessed image data to the master for further processing. Alternatively, all cameras 140, 142, 144 and 146 can be arranged to deliver image frames to a central vision system processing unit (e.g. a PC) via appropriate camera interfaces (for example, a USB link or TCP/IP-based network).

Note that the camera(s) herein can be previously (optionally) calibrated in view of intrinsics and/or other parameters. This can be accomplished using a conventional calibration plate as described herein.

The vision system processor/process 180 includes an associated alignment process 182 according to an illustrative embodiment. The alignment process 182 is constructed and arranged to ensure proper alignment of the outer edges 184 of the first work piece 110 with the inner edges 186 of the second, underlying work piece 112. This alignment process is in communication with the robot control 188 of the manipulator assembly 120 to follow and instruct z-axis motion and also with the motion stage controller 124 to follow and instruct x and y-axis motion. Based upon feedback from the alignment process 182, the motion stage 121 is controlled (typically in the x, y directions, and rotation R) to move the first work piece 110 into appropriate alignment with the second object 112 as the manipulator lowers the first work piece along the z axis into engagement with the second object.

In other manufacturing arrangements, a work piece/object under manufacture is aligned to the process equipment, such as screen printing of the cover glass of cell phones, tablet computers, and flat panel displays. Alignment challenges similar to those described above occur in such arrangements. As described further below, a variety of alternate arrangements that manipulate parts through a variety of motions are expressly contemplated in alternate embodiments. Typically, the vision system includes a model of the particular motion stage arrangement and this model is based, in part on the structure and function of the actuators causing the particular motion.

III. Calibration Process

Figure 2:
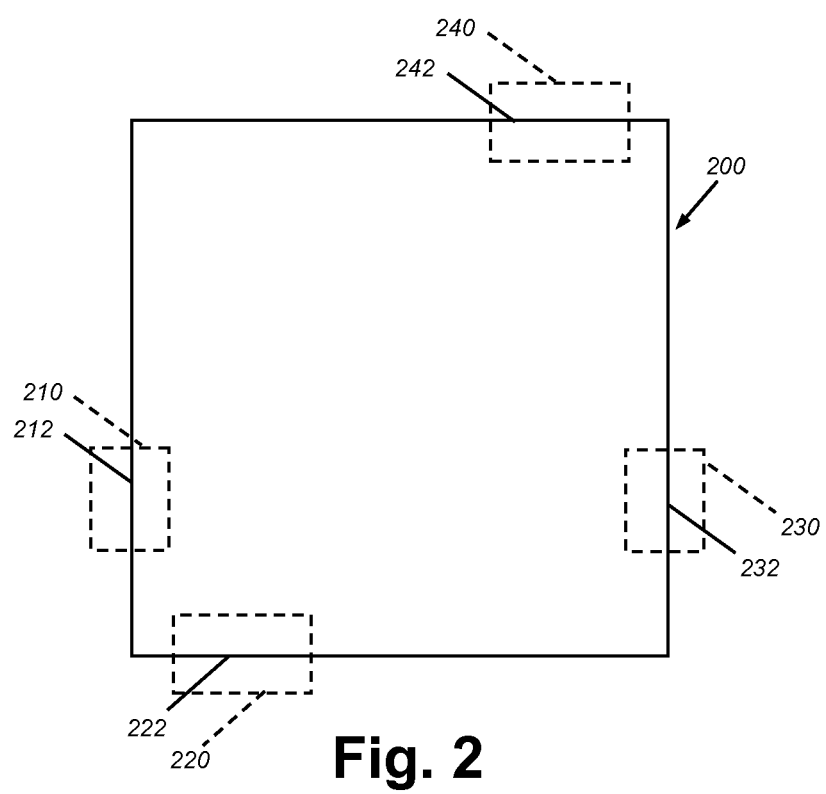
FIG. 2 is a schematic diagram of a plurality of vision system camera fields of view, each directed to a discrete region of an object containing a linear edge feature.

As shown in FIG. 2, it is common, in the presence of multiple cameras for each camera's field of view to track a portion of the overall object 200 as it is moved by a motion stage (or other conveyance) about the work area. As shown, the field of view 210, 220, 230 and 240 of each camera is located on a portion of the object 200 adjacent to a discrete edge 212, 222, 232 and 242, respectively. In various implementations, the portions of the object tracked respectively by each camera can remain within that camera's field of view throughout a runtime motion-stage-manipulation procedure. In other embodiments, it is contemplated that differing features can pass into a single camera's field of view. If so, appropriate tracking techniques are employed to differentiate between the different features.

In an illustrative embodiment, the alignment process 182 includes a training system that performs hand-eye calibration during a setup phase (generally prior to any runtime phase) using the (typically) linear edge features of the runtime object under manufacture 200. As described herein, the runtime object and/or "object under manufacture" is an object that is normally carried by the motion stage to perform one or more assembly and/or manufacturing steps. This is distinguished from an object used specifically for calibration of the camera(s)/vision system. As described generally above, hand-eye calibration, according to techniques known in the art, is employed to establish correspondence between image pixel coordinates and the motion stage coordinates, which motion stage physically moves the object into desired alignment. During calibration, the object is moved by the stage to a plurality of predetermined poses so that one-dimensional (1D) positional information characterized by the feature(s) can be derived at each pose. In this manner, and as noted above, the system and method reduces reliance of a special calibration object, which can be difficult and/or inconvenient to employ given the space constraints of the manufacturing/inspection environment.

Figure 3:
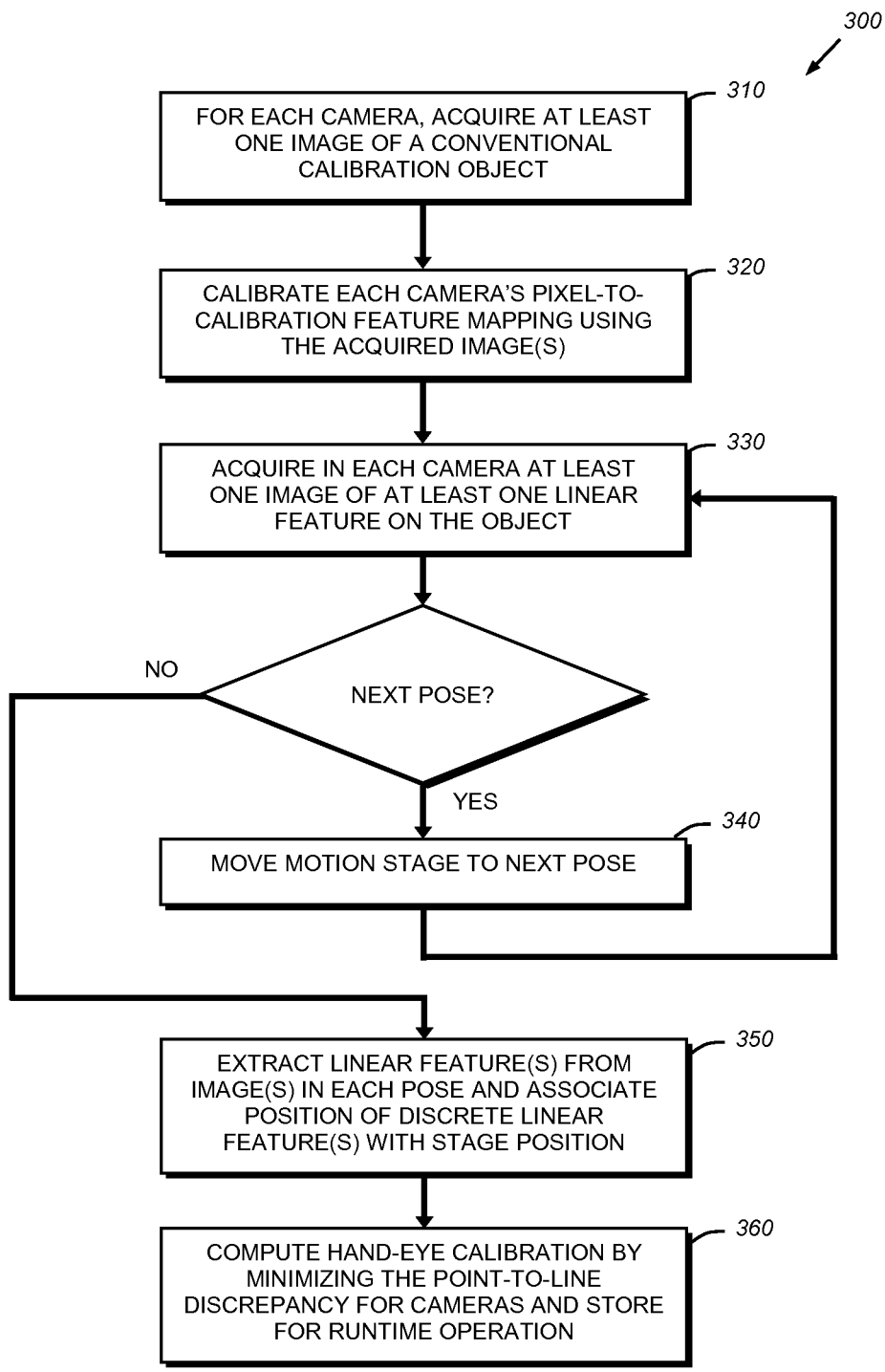
FIG. 3 is a flow diagram of a procedure for performing hand-eye calibration of one or more camera's using linear feature of a runtime object attached to a motion stage.

With reference to FIG. 3, a procedure 300 for hand-eye calibration using linear edge features is shown. For each camera, at least one image is acquired of a traditional/conventional calibration object—for example a "checkerboard" calibration plate in step 310. This image is used to calibrate each camera's particular image-to-physical mapping (or pixel-to-calibration feature mapping) in step 320. Intrinsic parameters of the camera(s) can be optionally employed in the process of determining the mapping, but are not required for the illustrative embodiments herein. In general, steps 310 and 320 entail no motion between the camera and the calibration object.

In step 330, a typical runtime object under manufacture is presented to the imaged scene, and each camera undergoing hand-eye calibration views one or more linear (i.e. straight line) features on the object (also sometimes termed a "work piece"), while the object is rigidly attached to the motion stage. These linear features can be edges or any other feature(s) that present(s) a discernible line segment—for example a printed edge, symbol or letter, a shelf, cutout, etc. In general, the vision system can employ typical edge detection techniques and tools to find such linear features during setup, and the user can manually flag these features for tracking during the calibration process. After acquiring images of the object at a first position and/or angle of rotation, the stage (and attached object) are moved to another predetermined pose (i.e., another x-y translational position and/or rotational angle R) until the last pose is assumed (decision step 332). At each such pose, each camera captures an image of the object/work piece (step 330). After images of the object in one or more of the poses are acquired, the viewed line features are extracted from those images (using the camera calibration parameters obtained from step 320). The relative physical position of the linear feature(s) is determined based upon an association of the known position of the motion stage (illustratively employing feedback provided by the controller 124 or other physical position sensing system (step 350)) with those discrete linear feature(s). This position information is then used to minimize any point-to-line discrepancy to thereby compute the hand-eye calibration that maps each camera's pixel position to a physical position in the motion stage's motion coordinate system with respect to the camera(s) in step 360 by minimizing the discrepancy in distance from an observed point to an expected line. More particularly, the calibration process and/or processor employs a so-called point-to-line metric, which is the perpendicular distance from a given point to a given line. Any point (pixel) on the observed line segment extracted from the image can serve as the point—it serves the role as the observed data in the correspondence. An expected line is a hypothesized model for the part edge being observed, and is affected by the particular motion stage pose at which the image was acquired. The distance from the point to the line is the discrepancy that the hand-eye calibration theory in accordance with the illustrative embodiment herein attempts to minimize.

IV. Motion Stage Arrangements

Reference is now made to FIGS. 4-7 that illustrate a plurality of different motion stage implementations according to skill in the art. Each of these implementations, as well as any equivalent arrangement can be employed in conjunction with the teachings of the illustrative embodiments.

Figure 4:
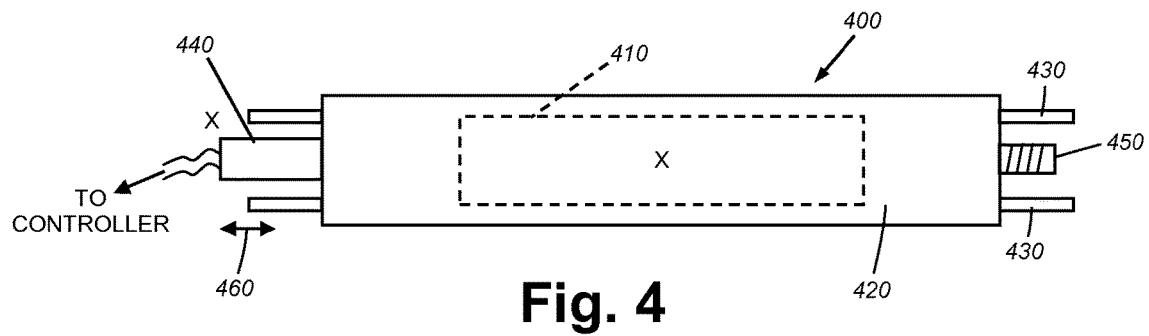
FIG. 4 is a schematic plan view of an single axis motion stage for use with the vision system in an illustrative embodiment.

FIG. 4 shows an exemplary single axis (e.g. x-axis or y-axis) motion stage 400 placed within the imaged scene according to an embodiment. The object 410 (shown in phantom lines) is attached to the stage slider 420 that moves on appropriate bearings along a track or other guide way (for example, rails 430) based upon linear bearings. The slider 420 is driven by an actuator motor 440. This motor can comprise any acceptable rotary or linear motor with appropriate linkages, reduction gear transmissions, etc. In an embodiment, the actuator motor 440 can comprise a servo or stepper motor that provides feedback control signals to an appropriate motor controller (described above). This controller allows the system processor to pinpoint the current position of the slider and compare that position with that reported by the vision system in the motion coordinate system. In this embodiment the motor 440 rotates a lead screw 450 of conventional design. The lead screw rotates versus a stationary threaded block on the slider 420, thereby transferring rotary to linear motion (double arrow 460) in a known ratio. In alternate embodiments the rotary actuator motor can be substituted with a linear motor that moves the slider according to known principles. The term "actuator" or "actuator motor" should be taken broadly to include a variety of rotary and linear motors, including those driven by electricity, fluid, and/or other motive forces.

Note that two or more (a plurality) of the above-described single-axis motion stages can be stacked (or otherwise arranged) in various configurations to generate orthogonal motion effects (e.g. an xy arrangement as described below). It is contemplated that motion stages can be arranged to generate three orthogonal degrees of motion (e.g. x, y and z axes), and optionally, one (or more) degree(s) of rotation R about the z axis. Additional degrees of translation and/or rotation (e.g. tilt about the x and/or y axes) is expressly contemplated in further stage configurations. A variety of vendors supply commercially available motion stages and motion stage components. For example, stages that translate in various combinations of degrees-of-freedom are available from Newmark Systems Incorporated of Rancho Santa *Margarita*, CA under the trademark MICROSLIDE™, among others.

Figure 5:
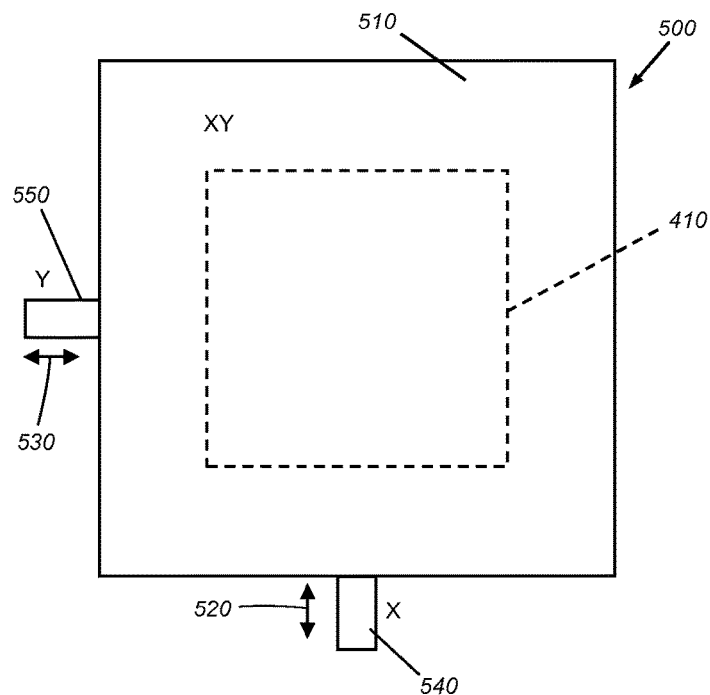
FIG. 5 is a schematic plan view of an three axis motion stage with rotation for use with the vision system in an illustrative embodiment.

With reference to FIG. 5, a two-axis motion stage 500 within the imaged scene, having an xy configuration is shown. The object under manufacture 410 is mounted on a slider 510 that moves under the drive force (double arrows 520 and 530) of two respective actuators (as described generally above) 540 and 550. These forces are arranged orthogonally within a 2D x-axis/y-axis (xy) plane. This plane generally defines the motion coordinate system for hand-eye calibration according to the embodiments herein.

Figure 6:
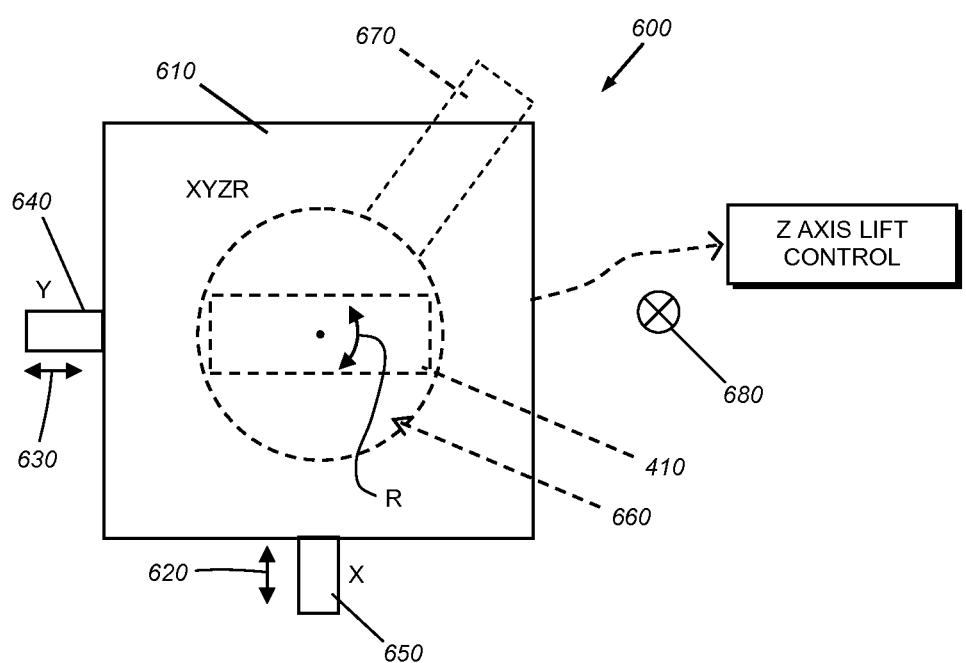
FIG. 6 is a schematic plan view of an two axis motion stage for use with the vision system in an illustrative embodiment.

With reference to FIG. 6, a four-degree motion stage 600 having an xyzR configuration is shown. The object under manufacture 410 is mounted on a slider 610 that moves under the drive force (double arrows 620 and 630) of two respective actuators (as described generally above) 640 and 650. Stated again, these forces are arranged orthogonally within a 2D x-axis/y-axis (xy) plane. This plane generally defines the motion coordinate system for hand-eye calibration according to the embodiments herein. Rotation (double curved arrow R) of the object 410 within the xy plane can be provided by a rotary stage 660 (shown in phantom), having an associated actuator 670 and appropriate gear transmission. A z-axis lift stage (not shown) moves the object 410 orthogonally (cross 680) to the xy plane—generally for purposes of driving the object into contact with an overlying object to which it is being aligned.

Figure 7:
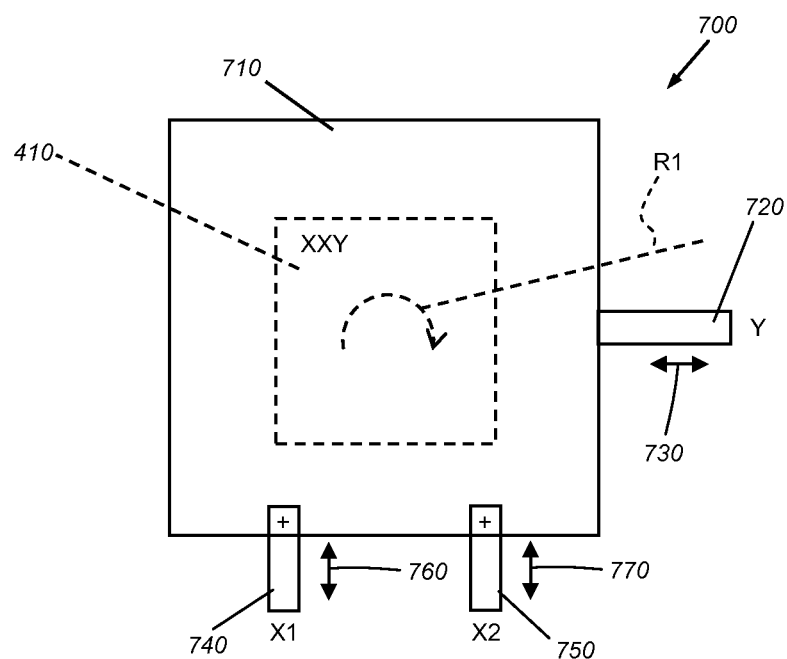
FIG. 7 is a schematic plan view of an XXY-type motion stage for use with the vision system in an illustrative embodiment.

It should be clear that a wide range of motion stage structures and configurations can be employed in conjunction with the system and method for hand-eye calibration described herein. FIG. 7 shows a particular exemplary (non-limiting example) motion stage configuration 700 according to an xxy arrangement. The slider 710 carries the object under manufacture 410 within the imaged scene. The actuator 720 translates (double arrow 730) the slider 710 along the y-axis direction. A pair of actuators 740 and 750 arranged in a spaced-apart orientation, translate (double arrows 760 and 770) the slider 710 along the orthogonal x-axis direction (designated x1 and x2). The two actuators 740 and 750 can be controlled independently of each other so that translation of each can occur in opposing directions simultaneously. The actuators can also be pivotally connected to the slider 710. As such, the opposing translation of each actuator 740 and 750 can induce limited rotation R1 within the xy plane. This enables limited rotational alignment of the object 410 with an associated, overlying object. Note that an optional z-axis lift can be provided and/or the aligned object (not shown in FIG. 7) can be lowered onto the object 410 by its manipulator in this and other exemplary configurations shown and described herein. More generally a so called UVW arrangement is provided to the stage slides. That is, a first slide and a second slide are nominally parallel to each other, and both the first and second slides are nominally perpendicular to a third slide. Each slide can be independently driven linearly. Additionally, it is expressly contemplated that a pair of actuators (similar to the x1, x2 arrangement) can be applied to the y-axis drive of the stage to provide an xxyy stage arrangement with limited rotation (double arrow R1) supplied by the actuators in both of the pair of orthogonal axes within the sameplane. That is, four slides are provided to the stage with a first and second slide being nominally parallel to each other and both the first and second being nominally perpendicular to a third and fourth slide—in which the third and fourth slides are respectively nominally parallel to each other. The use of two pairs of slides can serve to balance forces/load in each of the two orthogonal directions. As a further alternative, the stage can be arranged as an xyy arrangement where each slide can be driven linearly.

It should be more generally clear that the above-described system and method for hand-eye calibration using linear (or equivalent) features on a runtime object under manufacture in a planar (2D) motion environment affords significant improvements in setup efficiency and cost, and generally helps to avoid modifying the manufacturing environment to accommodate a conventional calibration object.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, in alternate embodiments the motion stage can be arranged as a manipulator arm, gantry or the like and the term "motion stage" should be taken broadly to include such configurations. For example, as used herein the terms "process" and/or "processor" should be taken broadly to include a variety of electronic hardware and/or software based functions and components. Also, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Moreover, it is contemplated that some or all vision system processing tasks can be carried out either in the main module or in a remote processor (e.g. a server or PC) that is operatively connected through the interface module to the main module via a wired or wireless communication (network) link. In addition, while the identification and tracking of linear features is herein described, it is expressly contemplated that both linear features and point features can be identified and discretely tracked by the overall system, thereby providing a system that mixes identification and tracking of both linear and point features on the object to generate a mapping for calibration. Accordingly, this description is meant to be taken only by way of example, and not to otherwise limit the scope of this invention.

What is claimed is:

1. A system for planar hand-eye calibration of a vision system using an object under manufacture having at least one feature, the object moving in at least one degree of freedom in translation or rotation on a motion stage, the system comprising:

at least a first vision system camera and vision processor, the first vision system camera being arranged to acquire an image of a portion of a first linear feature on the object under manufacture, the imaged portion of the first linear feature excluding end points of the first linear feature, and track motion of the first linear feature throughout movement from a first position to a second position in response to moving of the motion stage in the at least one degree of translation; and a process that identifies the first linear feature in the first position and the second position along a two-dimensional (2D) plane and that computes a mapping between pixel positions in a pixel coordinate system of the first camera and physical positions in a motion coordinate system based upon locations of the first position and the second position.

2. The system as a set forth in claim 1 wherein the first camera is intrinsically calibrated.

3. The system as set forth in claim 1 wherein the first linear feature is at least one of an edge, a shelf and a region with contrast difference.

4. The system as set forth in claim 1 further comprising a second vision system camera arranged to track a feature on the object.

5. The system as set forth in claim 4 wherein the second vision system camera is arranged to identify and discretely track at least one of the first linear feature and a second linear feature on the object under manufacture.

6. The system as set forth in claim 4 wherein the feature comprises a point feature and each of the first camera and the second camera are constructed and arranged to identify and discretely track either of a point feature or a linear feature.

7. The system as set forth in claim 1 wherein the motion stage includes at least a first slide that translates the object under manufacture along an x axis and a second slide that translates the object under manufacture along a y axis, orthogonal to the x axis, on the 2D plane.

8. The system as set forth in claim 7 wherein the motion stage includes a lift arranged to translate the object under manufacture orthogonally to the 2D plane along a z axis.

9. The system as set forth in claim 8 further comprising a rotary stage that rotates the object under manufacture about at least one of the x axis, the y axis and the z axis.

10. The system as set forth in claim 8 wherein at least one of the first slide, the second slide and the lift is powered by an actuator comprising a rotating lead screw and controlled motor.

11. The system as set forth in claim 1 further comprising a rotary stage that rotates the object under manufacture.

12. The system as set forth in claim 1 wherein the motion stage comprises a lead-screw driven slide and controlled motor operatively connected to the lead screw.

13. The system as set forth in claim 12 wherein the motor comprises at least one of a servo motor and a stepper motor.

14. The system as set forth in claim 1 wherein the motion stage comprises a slide and a controlled linear motor operatively connected thereto.

15. The system as set forth in claim 1 wherein the motion stage is arranged as a UVW type motion stage with a first slide and a second slide nominally parallel to each other, and each of the first slide and the second slide nominally perpendicular to a third slide.

16. The system, as set forth in claim 1 wherein the motion stage is arranged as an xxyy type motion stage with a first slide and a second slide nominally parallel to each other, and each of the first slide and the second slide nominally perpendicular to a third slide and a fourth slide, the third slide and the fourth slide being nominally parallel to each other, respectively.

17. A method for planar hand-eye calibration of a vision system using an object under manufacture having at least one feature, the object moving in at least one degree of freedom in translation or rotation on a motion stage, the method comprising the steps of:
providing at least a first vision system camera and vision processor, the first vision system camera being arranged to acquire an image of a portion of a first linear feature on the object under manufacture, the imaged portion of the first linear feature excluding end points of the first linear feature;
tracking motion of the first linear feature throughout movement from a first position to a second position in response to moving of the motion stage in the at least one degree of translation;
identifying the first linear feature in the first position and the second position along a two-dimensional (2D) plane; and
computing a mapping between pixel positions in a pixel coordinate system of the first camera and physical positions in a motion coordinate system based upon locations of the first position and the second position.

18. The method as set forth in claim 17 wherein the first linear feature is at least one of an edge, a shelf and a region with contrast difference.

19. The method as set forth in claim 17 further comprising, providing a second vision system camera arranged to track a feature on the object.

20. The method as set forth in claim 19 wherein the second vision system camera is arranged to identify and discretely track at least one of the first linear feature and a second linear feature on the object under manufacture.

* * * * *